United States Patent [19]
Asato

[11] Patent Number: 6,157,995
[45] Date of Patent: Dec. 5, 2000

[54] CIRCUIT AND METHOD FOR REDUCING DATA DEPENDENCIES BETWEEN INSTRUCTIONS

[75] Inventor: Creigton Asato, San Jose, Calif.

[73] Assignee: Advanced Micro Devices, Inc., Sunnyvale, Calif.

[21] Appl. No.: 09/166,440

[22] Filed: Oct. 5, 1998

[51] Int. Cl.$^7$ ...................................................... G06F 9/28
[52] U.S. Cl. ............................................................ 712/25
[58] Field of Search ........................................ 712/23, 25

[56] References Cited

U.S. PATENT DOCUMENTS

| | | | |
|---|---|---|---|
| 5,325,464 | 6/1994 | Pechanek et al. | 712/10 |
| 5,524,263 | 6/1996 | Griffth et al. | 712/23 |
| 5,546,597 | 8/1996 | Martell et al. | 712/23 |
| 5,809,275 | 9/1998 | Lesartre | 712/216 |

OTHER PUBLICATIONS

Johnson of Advanced Micro Devices, Inc., "Superscalar Microprocessor Design," PTR Prentice Hall, Inc., 1991, pp. 69–71.

Riseman, et al., "The Inhibition of Potential Parallelism by Conditional Jumps," Short Notes: IEEE Transactions on Computers, Dec. 1972, pp. 1405–1411.

Halfhill, "Beyond Pentium ll," BYTE Magazine–Dec. 1997, downloaded and printed from www.byte.com on Oct. 5, 1998, 9 pages.

Lee, "Branch Prediction Strategies and Branch Target Buffer Design," Computer, Jan. 1984, pp. 6–22.

*Primary Examiner*—David Y. Eng
*Attorney, Agent, or Firm*—Conley, Rose & Tayon, PC; B. Noel Kivlin

[57] ABSTRACT

A circuit and method is disclosed which reduces data dependencies between instructions within an application program thereby reducing time delays associated therewith. In one embodiment, a data dependent instruction is translated into at least first and second speculative data independent instructions wherein the data dependent instruction, if executed, produces results which are dependent on a data result provided by execution of a data independent instruction. The first and second speculative data independent instructions are executed to generate first and second speculative results. It is noted that these results are generated independent of the results produced by executing the data independent instruction. Once the data independent instruction is executed and its data result is generated, one of the first and second speculative results is invalidated depending on the value of the data results.

22 Claims, 4 Drawing Sheets

Instruction X, Instruction Y (Line 1)
Instruction 1, Instruction 2 (Line 2)

Instruction 1, Instruction 2A, Instruction 2B (Line 2)

Instruction X, Instruction 1 (Line 1)
Instruction 2, Instruction Y (Line 2)

Instruction 2A, Instruction 2B, Instruction Y (Line 2)

CIRCUIT AND METHOD FOR REDUCING DATA DEPENDENCIES BETWEEN INSTRUCTIONS

BACKGROUND OF THE INVENTION

1. Field of the Invention

This invention relates to superscalar microprocessors and, more particularly, a superscalar microprocessor in which data dependencies between instructions are reduced.

2. Description of the Relevant Art

Microprocessors can be implemented on one or more semiconductor chips. Semiconductor chip technology is increasing circuit densities. Speed within microprocessor are increasing by virtue of scalar computation with superscalar technology being the next logical step in the evolution of microprocessors. The term "superscalar" describes a computer implementation that includes performance by a concurrent execution of scalar instructions. Scalar instructions are the type of instructions typically found in general purpose microprocessors. Using today's semiconductor processing technology, a single microprocessor chip can incorporate high performance techniques that were once applicable only to large scale scientific processors.

Microprocessors run application programs. An application program comprises a group of instructions. In running application programs, microprocessor fetch and execute the instructions in some sequence. There are several steps involved in executing a single instruction, including fetching the instruction, decoding it, assembling the necessary operands, performing the operations specified by the instruction, and writing the results of the instruction to storage. The steps are controlled by a periodic clock signal. The period of the clock signal is the processor cycle time.

The time taken by a microprocessor to complete a program is determined by three factors: the number of instructions required to execute the program; the average number of processor cycles required to execute an instruction; and the processor cycle time. Microprocessor performance is improved by reducing the time taken by the microprocessor to complete the application program, which dictates reducing one or more of these factors.

One way to improve the performance of microprocessors is to overlap the steps of different instructions, using a technique called pipelining. In pipelining, the various steps of instruction execution are performed by independent units called pipeline stages. Pipeline stages are generally separated by clocked registers and the steps of different instructions are executed independently in different pipeline stages. Pipelining reduces the average number of cycles required to execute an instruction, though not the total amount of time required to execute an instruction, by overlapping instructions, thereby allowing processors to handle more than one instruction at a time. Pipelining reduces the average number of cycles per instruction by as much as a factor of 3.

A typical pipelined scalar microprocessor executes one instruction per processor cycle. A superscalar microprocessor reduces the average number of cycles per instruction beyond what is possible in a pipelined scalar processor by allowing concurrent execution of instructions in the same pipeline as well as concurrent execution of instructions in different pipelines. While superscalar processors are simple in theory, there is more to achieving increased performance than simply increasing the number of pipelines. Increasing the number of pipelines makes it possible to execute more than one instruction per cycle, but there is no guarantee that any given sequence of instructions can take advantage of this capability. Instructions are not always independent of one another, but are often interrelated. These interrelationships prevent some instructions from occupying the same pipeline stage. For example, certain instructions are data dependent which means, in one sense, that the data result of one instruction (the data dependent instruction) is dependent upon the data results of another instruction (the data independent instruction). For example, to add together two 64-bit words using a 32-bit ALU, the normal practice is to first add together the least significant 32 bits of the two addends, followed by an addition of the most significant 32 bits of the two addends and the carry that might be generated by the first addition. Performing the addition in this way requires that the results from the first addition instruction (the data independent instruction), in particular, the carry, being known before the second addition instruction (the data dependent) may be started. These relationships between instructions may prevent some instructions from occupying the same pipeline stage.

There is a penalty for executing instructions which are data dependent upon one another. In the example, execution of the second instruction for adding the most significant 32 bits of the two addends must be delayed until the carry of the first addition instruction is available. This delay may degrade processor performance. What is needed is a mechanism for removing dependencies between instructions in order to avoid delays in executing instructions which are dependent upon the data results of other instructions.

SUMMARY OF THE INVENTION

Problems outlined above are in large part solved by a superscalar microprocessor employing a method of speculatively executing instructions. By employing the present invention, data dependencies between instructions within an application program can be removed thereby eliminating or reducing time delays associated therewith. In one embodiment, a data dependent instruction is translated into at least first and second speculative data independent instructions wherein the data dependent instruction, when executed, produces results which are dependent on a data result provided by execution of a data independent instruction. The first and second speculative data independent instructions are executed to generate first and second speculative results. It is noted that these results are generated independent of the results produced by executing the data independent instruction. Once the data independent instruction is executed and its data result is generated, one of the first and second speculative results is invalidated depending on the value of the data results.

In one embodiment, the data independent instruction is defined as an instruction for adding n least significant bits of first and second 2n bit addends. The data result generated by executing the data independent instruction is defined as a n-bit result and a carry. The second speculative data independent instruction in this embodiment is defined as an instruction for adding n most significant bits of the first and second 2n-bit addends and a logical zero. The first speculative data independent instruction is defined in this embodiment as an instruction for adding n most significant bits of the first and second 2n-bit addends and a logical one.

As noted above, the data result produced by executing the data independent instruction is used in general to invalidate one of the first and second speculative results. In the above embodiment, the value of the carry bit is used to invalidate one of the first and second speculative results. More particularly, if the carry bit equates to logical one, then the first speculative result is invalidated. If the carry bit equates to a logical zero, the second speculative result is invalidated.

To manage the execution of the speculative data independent instructions and the subsequent invalidation of one of the speculative data independent instructions, the present invention contemplates, in one embodiment, generating a first instruction tag prior to executing the first speculative data independent instruction. This first instruction tag is tagged to the first speculative result produced by executing the speculative first data independent instruction. A second instruction tag is generated prior to executing the second speculative data independent instruction. This second instruction tag is tagged to the second speculative result produced by executing the second speculative data independent instruction. Additionally, a result status operand is generated in response to executing the another instruction. This result status operand is generated as function of the data result. Once the result status operand is generated, it is broadcasted through the microprocessor and compared with, in particular, the first and second instruction tags. In response to the comparison, one of the first and second speculative results is invalidated.

One advantage of the present invention is that it improves performance of microprocessors.

Another advantage of the present invention is that it mitigates delays associated with data dependent instructions.

BRIEF DESCRIPTION OF THE DRAWINGS

Other objects and advantages of the invention will become apparent upon reading the following detailed description and upon reference to the accompanying drawings in which.

Figure 1:
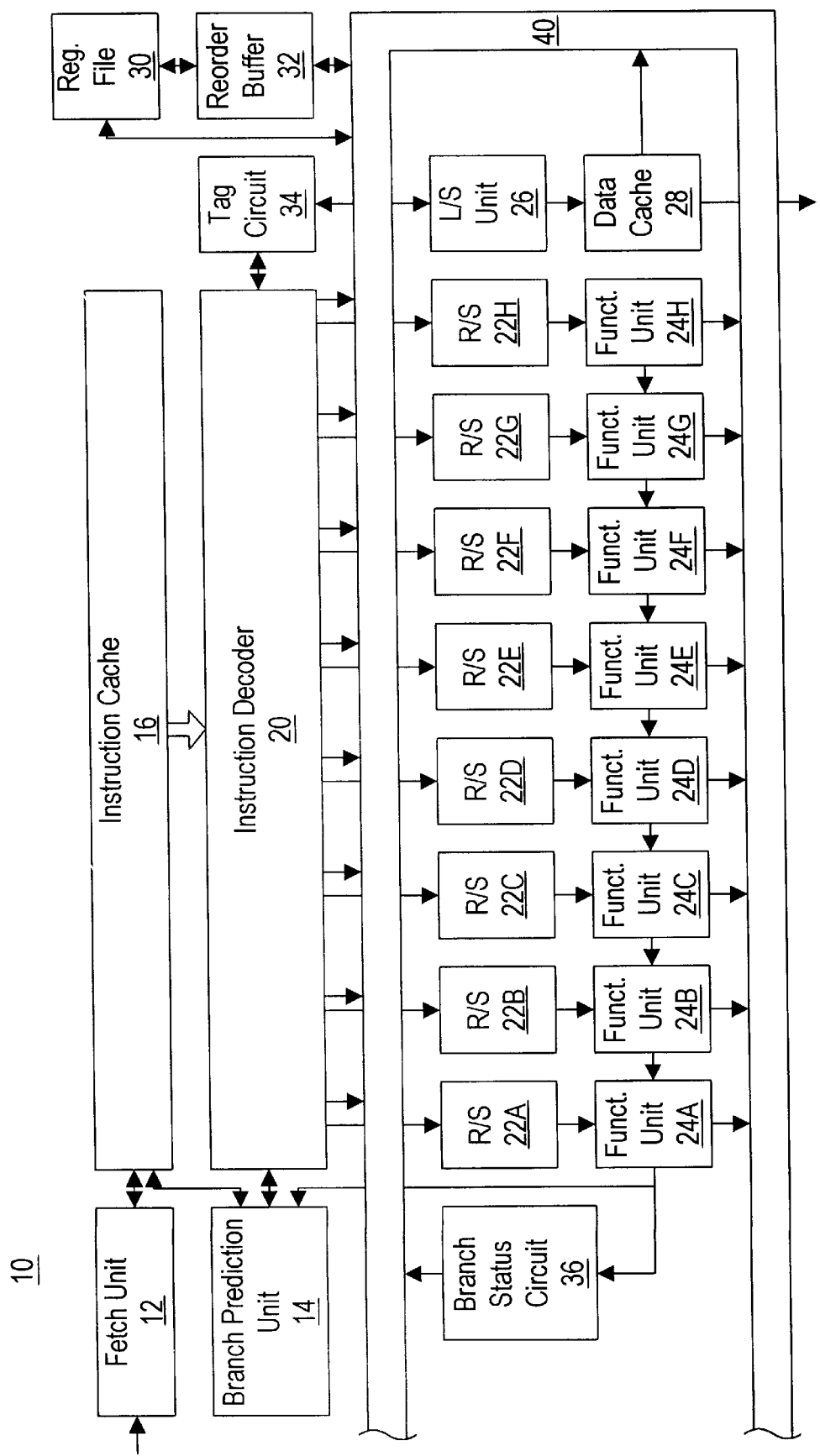
FIG. 1 is a block diagram one embodiment of a superscalar microprocessor employing the present invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of a microprocessor 10 employing one embodiment of the present invention is shown. Microprocessor 10 includes a fetch unit 12, a branch prediction unit 14, instruction cache 16, a decoder 20, a plurality of reservation stations 22A–22H, a plurality of functional units 24A–24H, a load store unit 26, a data cache 28, a register file 30, a reorder buffer 32, instruction tag circuit 34, and a result status operand circuit 36. Elements referred to herein with a particular reference number followed by a letter will be collectively referred to by the reference number alone. For example, reservation stations 22A–22H will be collectively referred to as reservation stations 22.

Fetch unit 12 is coupled to receive instructions from a main memory subsystem (not shown) and is further coupled to instruction cache 16 and branch prediction unit 14. In turn, branch prediction unit 14 is coupled to decoder 20 and functional units 24. Decoder or decode unit 20 is coupled to load/store unit 26 and to respective reservation stations 22A–22H. Reservation stations 22A–22H, in turn, are coupled to respective functional units 24A–24H. Additionally, decoder 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to main memory subsystem.

Instruction cache 16 is a high speed cache memory provided to store instructions. Instructions are fetched from main memory and subsequently stored into instruction cache 16 by fetch unit 12. Instructions are then fetched from instruction cache 16 in blocks or lines and dispatched to decoder 20 in accordance with a program counter (PC) in fetch unit 12.

Decoder 20 is shown in FIG. 1 as a single unit. However, it is understood that decoder 20 may consist of several individual decoder units, each one of which is configured to decode an instruction from the line of instructions received from instruction cache 16. In the embodiment shown in FIG. 1, decoder 20 receives lines of 2 instructions contained therein. However, it is to be understood that the present invention should not be limited thereto. Rather, the present invention has application to microprocessor units in which a greater or lesser number of instructions are provided in each instruction line received by decoder 20. Moreover, it is also understood that the present invention should not be limited to instruction lines or blocks containing a fixed number of instructions.

Microprocessor 10 employs a branch prediction unit 14 in order to speculatively execute instructions based on predicted resolutions of conditional branch instructions. Fetch unit 12 determines initial branch targets for conditional branch instructions fetched from main memory. Subsequent updates to the branch targets may occur due to the execution of branch instructions. Decoder 20 and functional units 24 provide update information to branch prediction unit 14. Functional units 24 execute the conditional branch instructions and determine whether the predicted branch direction is correct or incorrect. The branch direction may be "taken" so that subsequent instructions are fetched from the target address of the branch instruction. Conversely, the branch direction may be "not taken" such that subsequent instructions are fetched from memory locations consecutive and subsequent to the branch instructions. When a mispredicted branch instruction is detected, instructions subsequent to the mispredicted branch are discarded from the various units of microprocessor 10. A variety of suitable branch prediction algorithms may be employed by branch prediction unit 14.

Decoder 20 is configured to decode a block of instructions received from instruction cache 16. Register operand information is detected and routed to register file and reorder buffer 32. Additionally, if the instructions require one or more memory operations to be performed, decoder 20 dispatches memory operations to load/store unit 26. Each instruction is decoded into a set of control values by decoder 20 for functional units 24. These control values are dispatched to reservation stations 22 along with operand address information, displacement or immediate data which may be included within the instruction, and possible instruction tags which will be more fully described below. Decoder 20 may also detect data dependencies between intraline or interline instructions. As will be more fully described below, if decoder 20 detects a data dependency between intraline or interline instructions, decoder 20 translates the data dependent instruction into one or more speculative data independent instructions. Reorder buffer 32 may also be involved in detecting interline data dependencies. Accordingly, when an interline data dependency is detected, the combination of reorder buffer 32 and decoder 20 operate to translate the data dependent instruction into one or more speculative data independent instructions. The present invention the explained reference to translating eight data dependent instruction into first and second respective data independent instructions, it being understood that the present invention should not the limited thereto.

Microprocessor 10 supports out of order execution, and thus employs reorder buffer 32 to keep track of the original program sequence for register read and write operations, to implement register renaming, to allow for speculative instruction execution as noted above with reference to conditional branch instructions, and to facilitate precise exceptions. A temporary storage location within reorder buffer 32 is reserved upon decode of an instruction that involves the update of a register to thereby store speculative register states. The results of speculatively executed instructions can be invalidated in the reorder buffer before they are written to register file 30. Similarly, if a particular instruction causes an exception, instruction subsequent to the particular instruction may be discarded. In this manner, exceptions are "precise" (i.e., instructions subsequent to the particular instruction causing the exception are not completed prior to the exception). It is noted that in one sense a particular instruction is speculatively executed if it is executed prior to instructions which proceed a particular instruction program mode. Additionally, instructions can be speculative in the sense that they are the result of translating a data dependent instruction.

For each temporary storage location set up within reorder buffer 32, an area exists for an instruction tag associated with a speculative data independent instruction that involves the update of a register. Further, reorder buffer 32 may include a status operand/instruction tag comparator for comparing result status operands against instruction tags associated with speculative data independent instructions stored within reorder buffer 32 as will be more fully described below.

Instruction control values, instruction tags, and/or immediate or displacement data provided at the output of decoder 20 are collectively routed to respective reservation stations 22. In one embodiment, each reservation station is configured to hold instruction information (i.e., instruction control values, instruction tags, as well as operand values, operand tags, and/or immediate data) for up to 3 pending instructions awaiting issue to the corresponding functional unit. It is noted that in the embodiment of FIG. 1, each reservation station 22 is associated with a dedicated functional unit 24. Instructions dispatched to reservation stations 22 are executed by corresponding functional units 24.

Upon complete decode of a particular instruction, if a required operand is in a registered location, register address information is routed to reorder buffer 32 and register file 30 simultaneously. Reorder buffer 32 contains a temporary storage locations for results which change the contents of registers to thereby allow out of order execution. As noted above, the temporary storage location in reorder buffer 32 is reserved for each instruction which, upon decode, is determined to modify the contents of one of the registers within register file 30. Therefore, at various points during execution of a particular application program, reorder buffer 32 may have one or more locations which contain the speculatively executed contents of a single given register. If following decode of a given instruction, it is determined that reorder buffer 32 has a previous location or locations assigned to a register used as an operand in the given instruction, reorder buffer 32 forwards to the corresponding reservation station either: (1) the value in the most recently assigned location, or (2) an operand tag for the most recently assigned location if the value has not been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register reorder buffer 32, the operand value is taken directly from register file 30. If the operand corresponds to a memory location, the operand value is provided to reservation station through load/store unit 26.

As noted earlier, reservation stations 22 store instructions until the instructions are executed by corresponding functional units 24. An instruction is selected for execution if: (1) operands of the instructions have been provided, and (2) operands have not yet been provided for instructions which are within the same reservation station and which are prior to the instruction in program order. It is noted that when an instruction is executed by one of the functional units 24, the result of that instruction is passed directly to any reservation station 22 that is waiting for that result at the same time the result is passed to update reorder buffer 32. Additionally, result of that instruction may be passed to the result status operand circuit if that instruction is one from which an original data dependent instruction depended. An instruction may be selected for execution and passed to a functional unit 24 during the clock cycle that the associated result is forwarded. Reservation stations 22 route the forwarded result through the functional unit 24 in this case.

In one embodiment, each of the functional units 24 is configured to perform integer arithmetic operations of addition and subtraction, as well as shifts, rotates, logical operations, and branch operations. For the purposes of explanation of the present invention, functional units 24 will be limited to units with 32 bit arithmetic logic units (ALU), it being understood that the present invention should not be limited thereto. The operations are performed by the functional units in response to control values decoded for a particular instruction by decode unit 20. It is noted that instruction tags associated with certain instructions, i.e. speculative data independent instructions, are provided to the functional units so that the results of executing the spec data independent instructions are likewise tagged with the instruction tags. It is also noted that a floating point unit (not shown) may also be employed to accommodate the floating point operations. Additionally, functional units 24 may be configured to perform address generation for load and store memory operations performed by load/store unit 26.

As noted above the functional units 24 may provide information regarding the results of executed instructions to reserve status operand circuit 36. As will be more fully described below, result status operand circuit 36 may generate a result status operand which is subsequent used to invalidate certain respective data independent instructions.

Results produced by functional units 24 are sent through reorder buffer 32 where register values are being updated, and possibly to load/store unit 26. If the result is to be stored in a register, reorder buffer 32 stores the result in the location reserved for the value of the register when the instruction was decoded. A plurality of result buses 40 are included for forwarded results from functional units 24 and load/store unit 26. Result buses 40 convey the results generated, as well as the reorder buffer tag identifying the instruction being executed.

Load/store unit 26 provides an interface between functional units 24 and data cache 28. In one embodiment, load/store unit 26 is configured with a load/store buffer having locations for data and address information for pending loads or stores. Load/store unit 26 performs dependency checking for memory load operations against pending store operations to ensure that data coherency is maintained. The memory operation is a transfer of data between processor 10 and the main memory subsystem (not shown). Memory operations may be the result of an instruction which utilizes an operand stored in memory, or may be the result of a load/store instruction which causes the data transfer, but no other operation.

Data cache 28 is a high speed cache memory provided to temporarily store data being transferred between load/store unit 26 and main memory. It is understood that data cache 28 may be implemented in a variety of specific memory configurations including a set associative configuration.

Figure 2:
FIG. 2 illustrates a translation of a data dependent instruction into data speculative independent instructions when the data dependent instruction and the instruction from which it depends are contained within the same instruction line.
Figure 3:
FIG. 3 illustrates the translation of a data dependent instruction into speculative data independent instructions when the data dependent instruction and the instruction from which it depends, are contained in separate instruction lines.

FIGS. 2 and 3 illustrate translation examples of intra-instruction line data dependent instructions and inter-line data dependent instructions in accordance with one aspect of the present invention. With respect to FIG. 2, a line of instructions including data independent and data dependent instructions 1 and 2, respectively, are received by decoder 20 from instruction cache 16. Decoder 20 identifies the dependency of instruction 2 upon instruction 1. More particularly, decoder 20 identifies that the results generated by execution of instruction 2 depend upon the results generated by execution of instruction 1. The data dependency is such that instruction 2 cannot be executed prior to instruction 1. An example of this type of situation is illustrated with respect to a pair of instructions for adding two 64-bit addends using a 32-bit ALU within the functional unit. The normal practice is to first add together the least significant 32 bits of the two addends, and then add together the most significant 32 bits of the two addends with the carry that might be generated by the first addition. Accordingly, instruction 1 defines the addition of the least significant 32 bits of the two addends, and instruction 2 defines the addition of the most significant 32 bits of the two addends along with the carry that might be generated by instruction 1. Without the present invention, instruction 2 cannot be performed until the carry provided by instruction 1 is available. However, decoder 20 may include logic circuitry which identifies the data dependency between instruction 2 and instruction 1, and, in response, translates instruction 2 into two speculative data independent, instructions 2A and 2B, which are not dependent upon the outcome of instruction 1. Instruction 2A would add the 32 most significant bits of the two addends with a carry presumed to be a logical one. Instruction 2B would add the 32 most significant bits of the two addends with carry presumed to be a logical zero. As will be more fully described below, one of these instructions (instruction 2A or instruction 2B) 25 will be invalidated once the true carry provided by instruction 1 is known. It is noted that the logic circuitry for identifying the data dependency between instructions need not reside within decoder 20. Rather, the logic circuitry may be present in a unit external to the decoder 20.

FIG. 3 shows translation of inter-instruction line data dependent instructions. Here decoder 20 operating in cooperation with reorder buffer 42 identifies the dependency between instructions 1 and 2 of separate instruction lines. Once the data dependency is identified, decoder 20 translates data dependent instruction 2 into speculative data independent instructions 2A and 2B.

Figure 4:
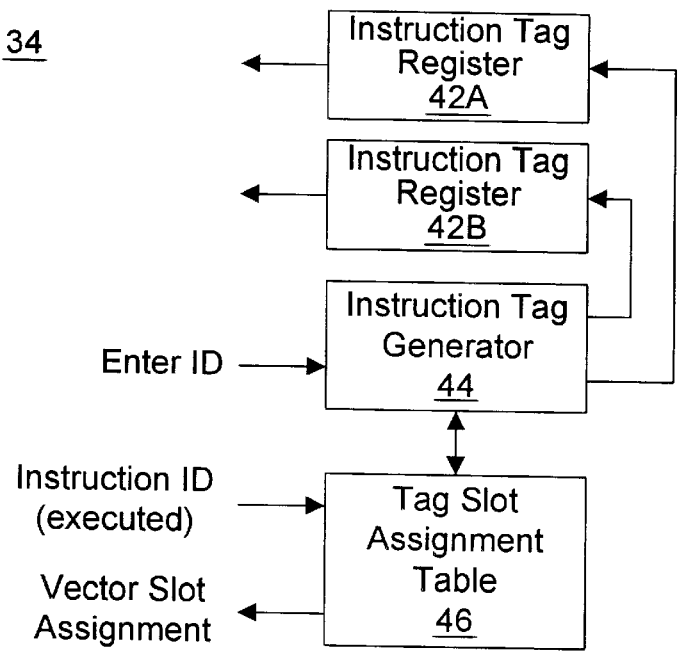
FIG. 4 is a block diagram of one embodiment of the instruction tag circuit shown in FIG. 1.
Figure 5:
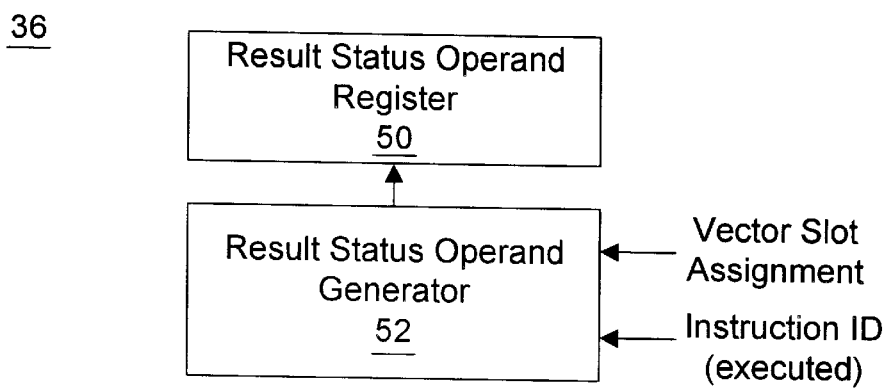
FIG. 5 is a block diagram of one embodiment of the result status operand circuit shown in FIG. 1.

FIG. 4 shows in block diagram form, one embodiment of the instruction tag generator of FIG. 1. FIG. 5 shows in block diagram form, one embodiment of the result status operand generator of FIG. 1. The instruction tag generator or circuit 34 and the result status operand circuits 36 shown in FIGS. 1, 4, and 5 are provided to manage the subsequent validation and invalidation of the results of executing speculative data independent instructions 2A and 2B in accordance one aspect of the present invention. With reference to FIG. 4, instruction tag circuit 34 includes an instruction tag registers 42A and 42B, an instruction tag generator 44, and a tag slot assignment table 46. When decoder 20 identifies data dependency between instructions (e.g. data independent instruction for adding the lower 32 bits of first and second 64-bit addends, and data dependent instruction for adding the upper 32 bits of the first and second 64-bit addends along with a carry provided by execution of the data independent instruction), decoder 20 provides instruction tag generator 44 with an identification of the data independent instruction. In response, instruction tag generator 44 accesses tag slot assignment table 46 to identify an available instruction tag slot which can be used for the data independent instruction. Once an available slot is identified, instruction tag generator 44 assigns the available slot to the independent instruction. This assignment is stored in tag slot assignment table 46. Subsequent thereto generator 44 generates first and second instruction tags which are stored within registers 42A and 42B using the assigned slot. The first and second instruction tags are subsequently used to tag first and second speculative data independent instructions and their results when generated.

Instruction tags stored within registers 42A and 42B are defined by multi-bit vectors, each vector occupying a particular slot in the instruction tag. For purposes of explanation, the present invention will describe with respect to instruction tags which are defined by multiple 2-bit vectors. However, it is to be understood that the number of bits in each vector is selected in accordance with a number of speculative data independent instructions resulting from the translation of a data dependent instruction. Again, the present invention will be described reference to data dependent instruction which is translated into first and second speculative data independent instructions 2A and 2B.

First and second instruction tags are generated with a 2-bit vector in the assigned slot wherein the high bit of the 2-bit vector in the first and second instruction tags is set to logical one to indicate that the translated instructions are speculative in nature. The low bits of the 2-bit vector in each of the first and second instruction tags are set to opposite states. The low bit in the first instruction tag is set to logical one to indicate that the first speculative data independent instruction will be executed with a carry bit presumed to be logic one, and wherein the low bit of the second instruction tag is set to logical zero to indicate that the second speculative data independent instruction will be executed with the carry bit presumed to be logical zero. In other words, the first and second instruction tags corresponding to speculative data independent instructions 2A and 2B, identify that these instructions are executed with separate presumptions of the value of the carry bit which is to be provided by the that independent instruction. It is noted that the remaining vectors within the first and second instruction tags are clear and their slot assignments may be in available for four future instruction tag generation upon detection of a subsequent data dependent instruction.

Once the instruction tags are generated and stored within registers 42A and 42B, they are provided to decoder 20 which in turn tags the speculative data independent instructions accordingly. Instruction tags follow the speculative data independent instructions. In other words, the results of the speculative data independent instructions, once generated, may be provided to reorder buffer 32 along with their associated instruction tags.

FIG. 5 is a block diagram of the result status operand circuit 36 of FIG. 1. Result status operand circuit includes result status operand register 50 coupled in result status operand generator 52. Result status operand is coupled to each of the functional units 24. Result status operand circuit 36 is configured to receive information from one of the functional units associated with the result data produced in response to executing a data independent instruction of an original data independent/data dependent pair. Result status operand circuit 36 receives information indicating that the data independent instruction is executed and produced data results having a first value. In response, result status operand circuit 36 accesses tag slot assignment table 46 with an identification of the executed data independent instruction. Tag slot assignment table 46, in turn, responds with information identifying the slot to the corresponding speculative data independent instructions described above. Result status operand generator 52 uses the assigned slot to generate the appropriate result status operand, which is subsequently stored in result status operand register 50.

Result status operand in general is defined by a plurality of multibit vectors. In the present example, the result status operand is defined by a plurality of 2-bit vectors and have the same length as the instruction tags. The high bit of the 2-bit vector in the slot assigned to the independent data instruction, is set to logical one. The low bit of this 2-bit vector is set according to the data result of executing the data independent instruction. For example, if the carry result of executing the data independent instruction equates to logical one, then low bit of the 2-bit vector is set to logical one. On the other hand if the carry result of executing the data independent instruction equates to logical zero, then low bit is set to logical zero. Once the result status operand is generated and stored within register 50, it is subsequently broadcasted throughout microprocessor 10 where it is compared against each outstanding instruction tag. As a result of comparing the result status operand and the instruction tags, at least one result of a speculative or data independent instruction is invalidated.

Figure 6:
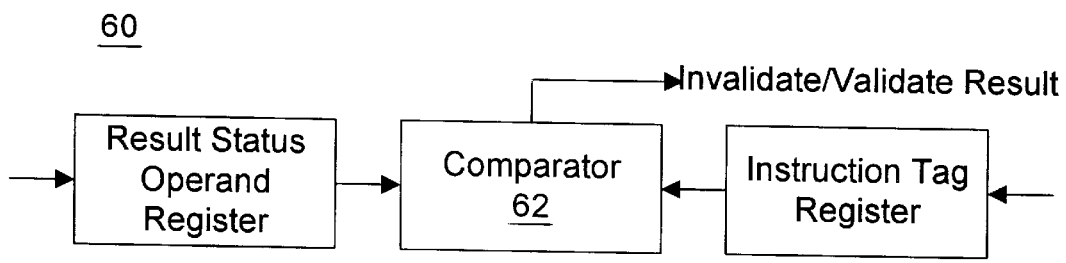
FIG. 6 is a block diagram of one embodiment of a status/tag comparing device employed in the microprocessor of FIG. 1.

FIG. 6 is a block diagram of a comparator circuit 60 for comparing broadcasted result status operands against instruction tags associated with results of executed speculative data independent instructions. The comparator circuit includes a comparator 62 configured to receive the broadcasted result status operand and an instruction tag. If corresponding high bits of the compared result status operand and instruction tag 2-bit vectors are both set to logical one, then the low bits of the compared result status operand and instruction tag vectors determine whether the corresponding speculative result is to be invalidated or not. In other words, if the low bits compare equally, the corresponding speculative result is validated. If the low bits compare unequally, the corresponding speculative result is invalidated. Comparator 62 issues a signal which validates or invalidates the corresponding tagged specualtive result.

By associating each translated speculative or data independent instruction with a multibit instruction tag, several data dependent instructions can be translated and issued from decoder 20 and managed accordingly. Each instruction tag is defined by 2n bits arranged as multibit vectors.

Figure 7:
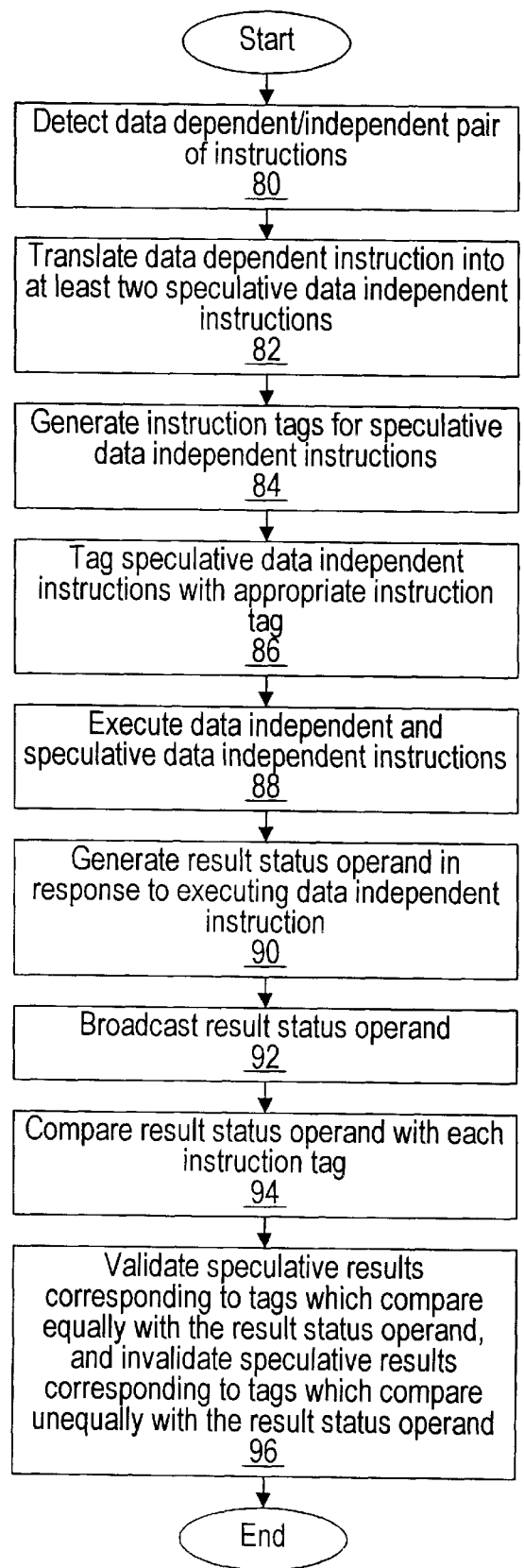
FIG. 7 illustrates one aspect of translating a data dependent instruction into speculative data independent instructions and tagging the resulting speculative data independent instructions with instruction tags in accordance with one aspect of the present invention.

FIG. 7 shows a flow chart illustrating operational aspects of translating a data dependent instruction into a pair of speculative data independent instructions, and invalidating one of the executing the speculative data independent instructions. In step 80, decoder 20 detects a data dependent/ independent pair of instructions. In response, as shown in step 82, decoder 20 translates the data dependent instruction into two speculative data independent instructions. Thereafter, in step 84, instruction tag circuit generates instruction tags for the speculative data independent instructions. The speculative data independent instructions are subsequently tagged with the appropriate instruction tag in step 84. At step 86, the data independent and speculative data independent instructions are executed. It is noted that the speculative data independent instructions can be executed prior to the data independent instruction since there are no dependencies between them. In step 88, after execution of the data independent instruction, a result status operand is generated, the value of which is dependent upon the result of executing the data independent instruction. In step 92, the result status operand is broadcasted throughout the microprocessor 10. In step 94, the result status operand is compared with each instruction tag. In step 96, speculative results corresponding to instruction tags which compare equally with the result status operand are validated, while speculative results correspond into tags which compare unequally with the result status operand are invalidated.

Numerous variations and modifications will become apparent to those skilled in the art once the above disclosure is fully appreciated. It is intended that the following claims be interpreted to embrace all such variations and modifications.

What is claimed is:

1. A method of executing instructions in a microprocessor, the method comprising:

translating a data dependent instruction into at least first and second data independent speculative instructions, wherein the data dependent instruction, when executed, produces results which are dependent on a data result provided by execution of a data independent instruction;

executing the first data independent speculative instruction to generate a first speculative result;

executing the second data independent speculative instruction to generate a second speculative result;

executing the data independent instruction to generate the data result, wherein the first data independent speculative instruction and the second data independent speculative instruction are executed prior to or in parallel with the data independent instruction, and;

invalidating one of the first and second speculative results depending on a value of the data result.

2. The method of claim 1 wherein one of the first and second speculative results is invalidated in the same clock cycle when the first and second data independent speculative instructions are executed.

3. The method of claim 1 wherein the data independent instruction is defined as an instruction for adding n least significant bits of first and second 2n bit addends, and wherein the data result is defined as an n bit result operand and a carry.

4. The method claim 3 wherein the second data independent speculative instruction is defined as an instruction for adding n most significant bits of the first and second addends and a logical zero.

5. The method of claim 4 wherein the first data independent speculative instruction is defined as an instruction for adding n most significant bits of the first and second addends and a logical one.

6. The method of claim 5 wherein the first speculative result is invalidated if the carry equals logical one, and wherein the second speculative result is invalidated if the carry equals logical zero.

7. The method of claim 6 wherein the first speculative result is invalidated if the data result equals a first value, and wherein the second speculative result is invalidated if the data result equals a second value.

8. The method of claim 1 further comprising:

generating a first instruction tag prior to executing the first data independent speculative instruction;

tagging the first result with the first instruction tag;

generating a second instruction tag prior to executing the second data speculative independent instruction;

tagging the second result with the second instruction tag;

generating a result status operand in response to executing the data independent instruction, wherein the result status operand is generated as a function of the data result;

comparing the result status operand with the first and second instruction tags, wherein one of the first and second speculative esults is invalidated in response to comparing the result status operand with the first and second instruction tags.

9. A microprocessor comprising:

an instruction decoder configured to receive a data dependent instruction and a data independent instruction wherein the data dependent instruction produces results, when executed, which depend on a data result provided by execution of the data independent instruction, and wherein the instruction decoder is configured to translate the data dependent instruction into first and second data independent speculative instructions;

a first functional unit configured to receive and execute the first data independent speculative instruction, wherein the first functional unit is configured to generate a first speculative result in response to executing the first data independent speculative instruction;

a second functional unit configured to receive and execute the second data independent speculative instruction, wherein the second functional unit is configured to generate a second speculative result in response to executing the second data independent speculative instruction, wherein the first and second functional units are configured to execute the first and second data independent speculative instructions in parallel;

a circuit for invalidating one of the first and second speculative results depending on a value of the data result.

10. The microprocessor of claim 9 further comprising:

an instruction tag circuit configured to generate first and second instruction tags, wherein the first and second instruction tags are tagged to the first and second speculative results, respectively;

a result status operand circuit configured to generate a result status operand in response to a functional unit executing the data independent instruction, wherein the result status operand is generated as a function of the data result value;

wherein the circuit for invalidating one of the first and second speculative results further comprises a comparator for comparing one of the first and second instruction tags with the result status operand.

11. The microprocessor of claim 9 wherein the data independent instruction is defined as an instruction for adding n lower bits of first and second 2n bit addends, and wherein the data result is defined as an n bit result operand and a carry.

12. The microprocessor of claim 11 wherein the second data independent speculative instruction is defined as an instruction for adding n most significant bits of the first and second addends and a logical zero.

13. The microprocessor of claim 12 wherein the first data independent speculative instruction is defined as an instruction for adding n most significant bits of the first and second addends and a logical one.

14. The microprocessor of claim 9 wherein the first speculative result is invalidated if the data result equals a first value, and wherein the second speculative result is invalidated if the data result equals a second value.

15. The microprocessor of claim 9 wherein each of the first and second functional units is defined to include a n-bit arithmetic logic unit.

16. The microprocessor of claim 13 further comprising a circuit for concatenating the n-bit result operand and the other of the first and second speculative results.

17. A method of executing instructions in a microprocessor, the method comprising:

translating a data dependent instruction into first and second data independent speculative instructions, wherein the data dependent instruction produces results, when executed, which depend on a data result provided by execution of a data independent instruction;

executing the first data independent speculative instruction to generate a first speculative data result;

executing the second data independent speculative instruction to generate a second speculative data result;

executing the data independent instruction to generate the data result, wherein the first data independent speculative instruction, the second data independent speculative instruction, and the data independent instruction are executed in parallel, and;

invalidating one of the first and second speculative results depending on a value of the data result.

18. The method of claim 17 wherein the data independent instruction is defined as an instruction for adding n least significant bits of first and second 2n bit addends, and wherein the data result is defined as a n-bit result operand and a carry.

19. The method claim 18 wherein the second data independent speculative instruction is defined as an instruction for adding n most significant bits of the first and second addends and a logical zero.

20. The method of claim 19 wherein the first data independent speculative instruction is defined as an instruction for adding n most significant bits of the first and second addends and a logical one.

21. The method of claim 20 wherein the first speculative result is invalidated if the carry equals logical one, and wherein the second speculative result is invalidated if the carry equals logical zero.

22. The method of claim 21 wherein the first speculative result is invalidated if the third result equals a first value, and wherein the second speculative result is invalidated if the third result equals a second value.

* * * * *